(12) United States Patent
Frank et al.

(10) Patent No.: US 8,644,763 B2
(45) Date of Patent: Feb. 4, 2014

(54) COOPERATIVE TRANSCEIVING BETWEEN WIRELESS INTERFACE DEVICES OF A HOST DEVICE

(75) Inventors: Edward H. Frank, Atherton, CA (US); Brima B. Ibrahim, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/346,573

(22) Filed: Jan. 9, 2012

(65) Prior Publication Data

US 2012/0106457 A1 May 3, 2012

Related U.S. Application Data

(63) Continuation of application No. 10/387,249, filed on Mar. 12, 2003, now abandoned.

(60) Provisional application No. 60/400,226, filed on Aug. 1, 2002.

(51) Int. Cl.
*H04B 1/00* (2006.01)
*H04B 15/00* (2006.01)

(52) U.S. Cl.
USPC .......... 455/63.1; 455/448; 455/454; 455/502; 455/501; 455/500; 455/575.7; 455/562.1; 370/328; 370/329; 370/248; 370/338; 370/334; 370/322

(58) Field of Classification Search
USPC ................. 455/328, 329, 348, 338, 334, 322
See application file for complete search history.

(56) References Cited

U.S. PATENT DOCUMENTS

| | | | |
|---|---|---|---|
| 5,959,984 A | 9/1999 | Dent | |
| 6,763,483 B2 * | 7/2004 | Penick et al. | 714/39 |
| 6,888,811 B2 | 5/2005 | Eaton et al. | |
| 6,975,667 B2 | 12/2005 | Mattisson et al. | |
| 7,099,671 B2 | 8/2006 | Liang | |
| 2001/0010689 A1 * | 8/2001 | Awater et al. | 370/344 |
| 2003/0083095 A1 * | 5/2003 | Liang | 455/552 |
| 2004/0022210 A1 | 2/2004 | Frank et al. | |

FOREIGN PATENT DOCUMENTS

| | | |
|---|---|---|
| EP | 1 119 137 A1 | 7/2001 |
| EP | 1 199 842 A1 | 4/2002 |
| WO | WO 01/84789 A2 | 11/2001 |
| WO | WO 02/19662 A1 | 3/2002 |

* cited by examiner

*Primary Examiner* — Kwasi Karikari
(74) *Attorney, Agent, or Firm* — Sterne, Kessler, Goldstein & Fox P.L.L.C.

(57) ABSTRACT

A method and/or apparatus for cooperative transceiving between wireless interface devices of a host device includes processing that begins by providing an indication of receiving an inbound packet from one wireless interface device (e.g., Bluetooth compliant radio transceiver, IEEE 802.11 compliant radio transceiver, etc.) to another. The wireless interlace device receiving the indication processes the indication and, based on the processing, transmits an outbound packet in accordance with the processing of the indication. For example, the wireless interface device receiving the indication may delay transmission until the other wireless interface device has received the packet, or, if transmission of the packet would not interfere with the receiving of the packet by the other wireless interface device, the wireless interface device receiving the indication would transmit its packet.

23 Claims, 5 Drawing Sheets

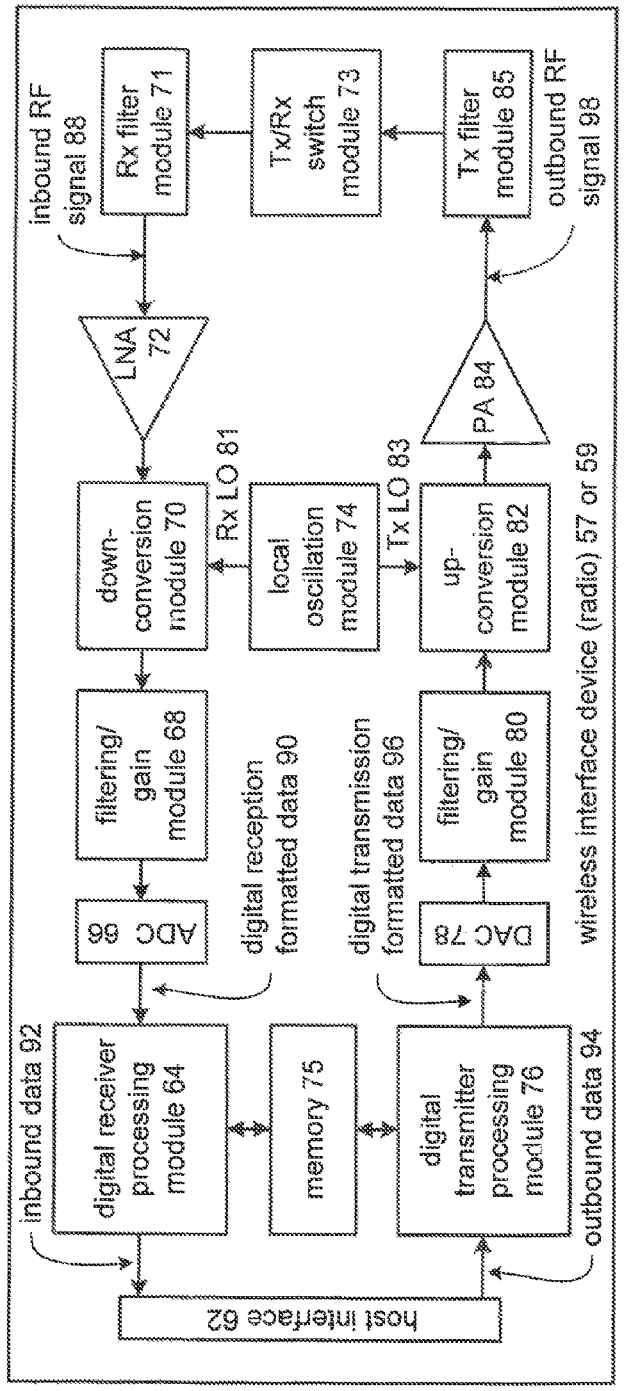
FIG. 3
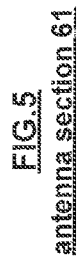
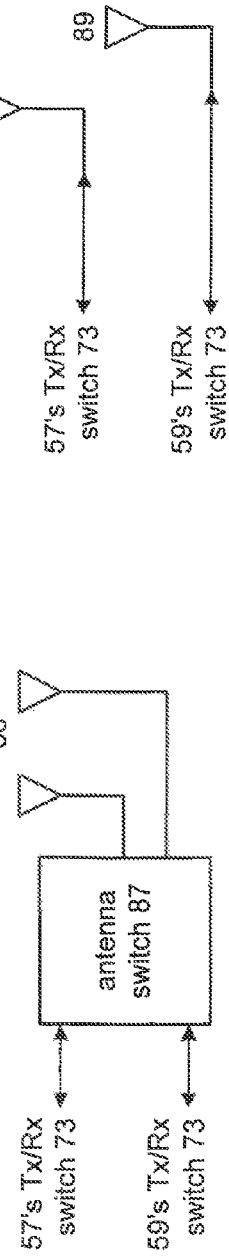
FIG. 4
antenna section 61
FIG. 5
antenna section 61

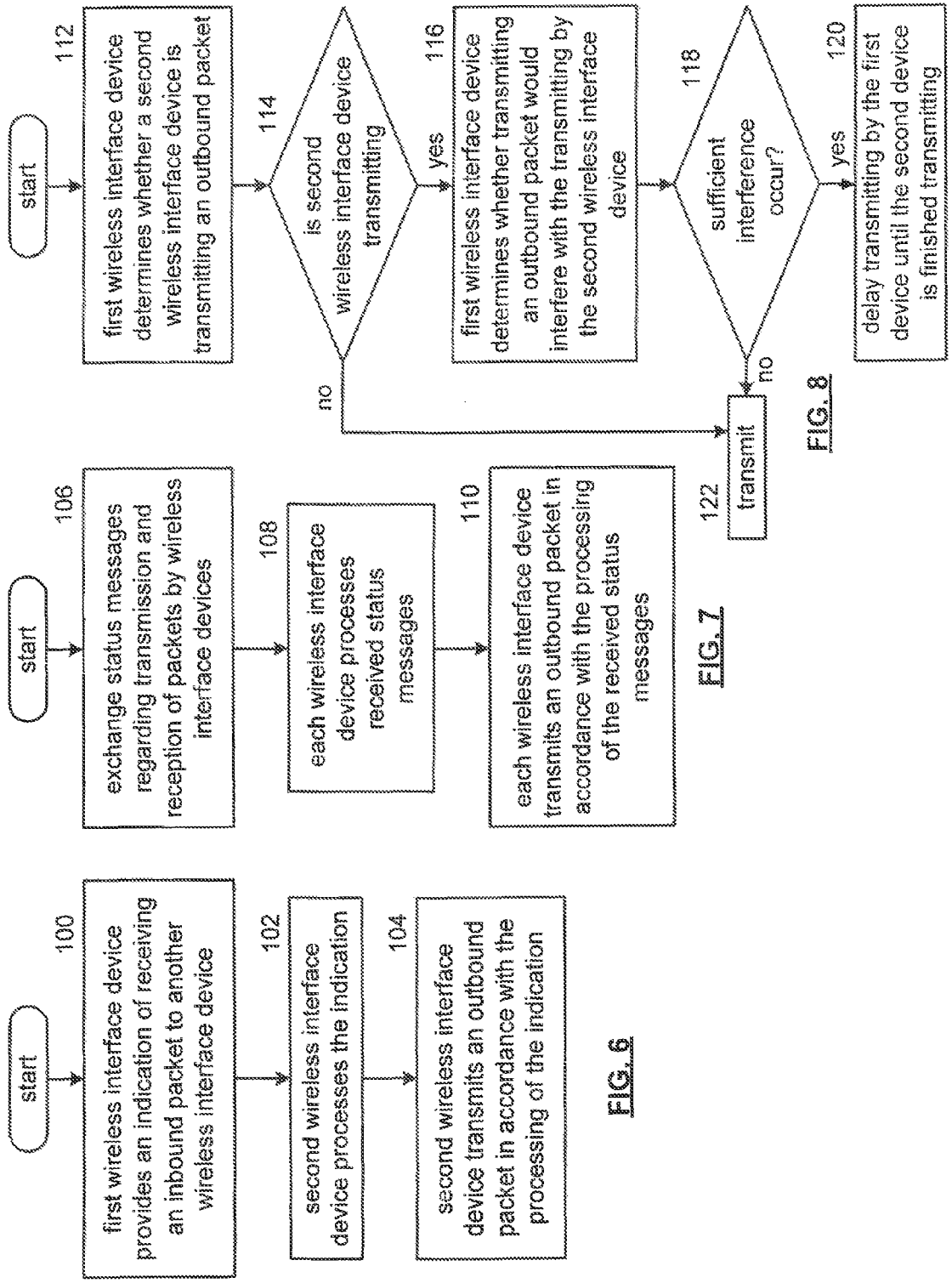

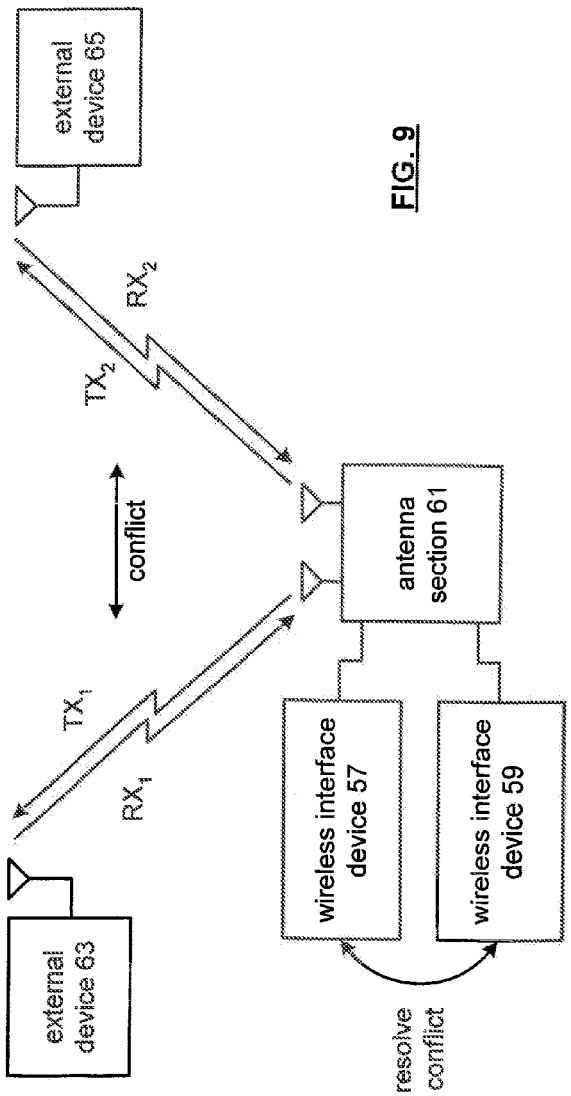

COOPERATIVE TRANSCEIVING BETWEEN WIRELESS INTERFACE DEVICES OF A HOST DEVICE

CROSS-REFERENCE TO RELATED APPLICATION PAPERS

This application is a continuation of U.S. patent application Ser. No. 10/387,249, filed on Mar. 12, 2003, which claims priority to U.S. Provisional 60/400,226, filed Aug. 1, 2002, all of which is incorporated herein by reference in their entireties.

BACKGROUND OF THE INVENTION

1. Technical Field of the Invention

This invention relates generally to wireless communication systems and more particularly to cooperative transceiving by wireless interface devices of the same host device.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As the use of wireless communication devices increases, many wireless communication devices will include two or more radio transceivers, where each radio transceiver is compliant with a different wireless communication standard. For instance, a computer may include two radio transceivers: one for peripheral device interfacing and another for wireless local area network (WLAN) interfacing. Even though the two radio transceivers are compliant with different wireless communication standards, they may occupy the same or similar frequency spectrum, thus will interfere with each other's ability to receive inbound packets. For example, if one radio transceiver is compliant with Bluetooth and the other is compliant with IEEE 802.11, both radio transceivers would operate in the 2.4 GHz frequency range.

In this example, if the Bluetooth radio transceiver is receiving a packet and the IEEE 802.11 radio transceiver begins transmitting a packet, the transmission will interfere with the Bluetooth radio transceiver's ability to accurately receive the packet. Similarly, if the IEEE 802.11 radio transceiver is receiving a packet and the Bluetooth radio transceiver begins transmitting a packet, the transmission by the Bluetooth radio will interfere with the IEEE 802.11 radio transceiver's ability to accurately receive the packet. In addition, concurrent transmission by both the IEEE 802.11 radio transceiver and the Bluetooth radio transceiver may cause interference, thus corrupting the one or both transmissions.

Therefore, a need exists for a method and apparatus that provides cooperation between two or more wireless interface devices (i.e., radio transceivers) of a host devices to substantially eliminate interfere causes by concurrent packet reception and/or packet transmission.

BRIEF SUMMARY OF THE INVENTION

A method and/or apparatus for cooperative transceiving between wireless interface devices of a host device in accordance with the present invention substantially meets these needs and others. One embodiment of a method begins by providing an indication of receiving an inbound packet from one wireless interface device (e.g., Bluetooth compliant radio transceiver, IEEE 802.11 (including all current and future subsections) compliant radio transceiver, etc.) to another. The wireless interface device receiving the indication processes the indication and, based on the processing, transmits an outbound packet in accordance with the processing of the indication. For example, the wireless interface device receiving the indication may delay transmission until the other wireless interface device has received the packet, or, if transmission of the packet would not interfere with the receiving of the packet by the other wireless interface device, the wireless interface device receiving the indication would transmit its packet.

Another embodiment of a method for cooperative transceiving between wireless interface devices of a host device begins as the wireless interface devices exchange status messages regarding transmission and reception of packets. The method continues with each of the wireless interface devices of the host device processing the received status messages. In response to the processing, each of the wireless interface devices transmits an outbound packet in accordance with the processing of the received status messages.

An embodiment of a wireless communication device includes a host module, a first wireless interface device, a second wireless interface device, and an antenna section. The first wireless interface device is operably coupled to the host module and transceives data between the host module and a first external device in accordance with a first wireless communication protocol (e.g., Bluetooth). The second wireless interface device is also operably coupled to the host module and transceives data between the host module and a second external device in accordance with a second wireless communication protocol (e.g., IEEE 802.11, including all current and future subsections). The antenna section is operably coupled to the first and second wireless interface devices to provide at least one radio frequency communication path between the first wireless interface device and the first external device and between the second wireless interface device and the second external device.

Yet another embodiment of a method for cooperative transceiving between wireless interface devices of a host device begins as a first wireless interface device determines whether a second wireless interface device is transmitting an outbound packet. The method continues as the first wireless interface device determines whether transmitting a first outbound packet would interfere with the transmitting of the second outbound packet when the second wireless interface device is transmitting the second outbound packet. The method further continues as the first wireless interface devices delays transmitting of the first outbound packet until the second outbound packet has been transmitted when the transmitting of the first outbound packet would interfere with the transmitting of the second outbound packet.

BRIEF DESCRIPTION OF THE SEVERAL VIEWS OF THE DRAWINGS

FIG. 3 is a schematic block diagram of a wireless interface device in accordance with the present invention;

FIG. 4 is a schematic block diagram of an embodiment of an antenna section in accordance with the present invention;

FIG. 5 is a schematic block diagram of another embodiment of an antenna section in accordance with the present invention;

FIG. 6 is a logic diagram of a method for cooperative transceiving between wireless interface devices of a host device in accordance with the present invention;

FIG. 7 is a logic diagram of another method for cooperative transceiving between wireless interface devices of a host device in accordance with the present invention;

FIG. 8 is a logic diagram of yet another method for cooperative transceiving between wireless interface devices of a host device in accordance with the present invention; and FIG. 9 is a diagram illustrating cooperative transceiving between wireless interface devices of a host device in accordance with the present invention.

DETAILED DESCRIPTION OF THE INVENTION

Figure 1:
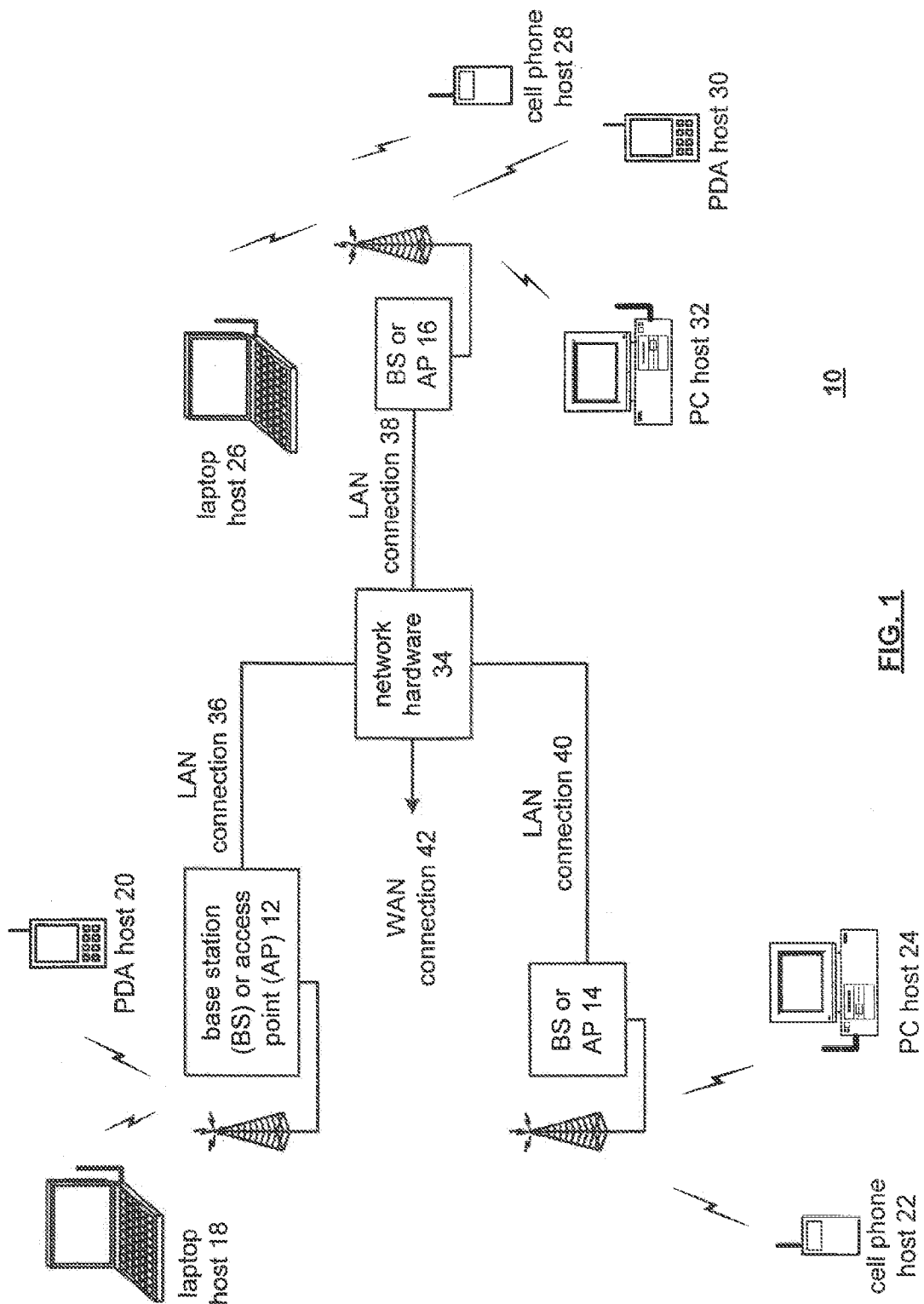
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIGS. 2-8.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
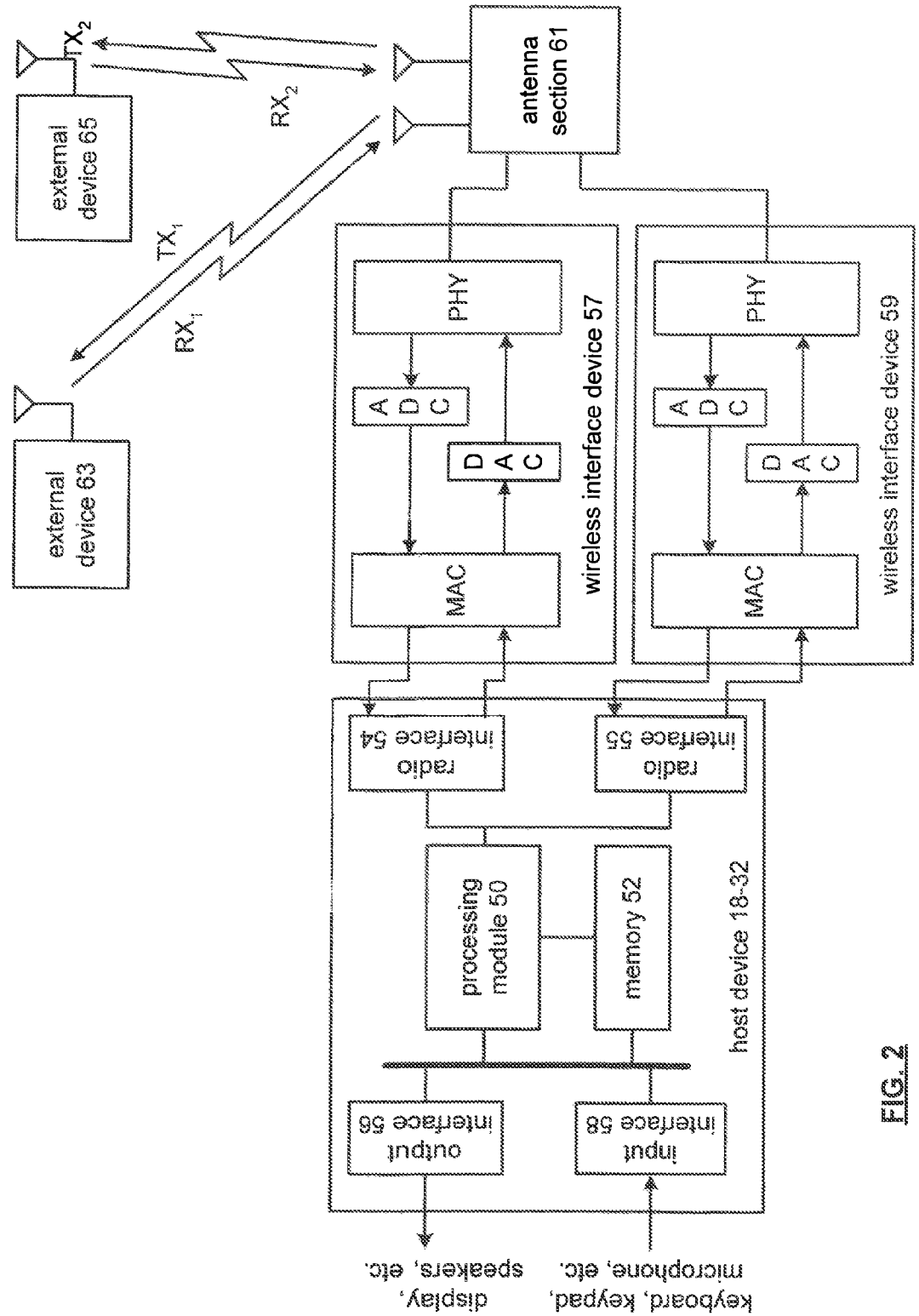
FIG. 2 is a schematic block diagram of a wireless communication device in accordance with the present invention.

FIG. 2 is a schematic block diagram illustrating a wireless communication device that includes the host device, or module, 18-32 and at least two wireless interface devices, or radio transceivers, 57 and 59. The wireless interface devices may be built in components of the host device 18-32 or externally coupled components. As illustrated, the host device 18-32 includes a processing module 50, memory 52, radio interfaces 54 and 55, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interfaces 54 and 55 each include a media-specific access control protocol (MAC) layer module, a digital-to-analog converter (DAC), an analog to digital converter (ADC), and a physical layer module (PHY). The radio interfaces 54 and 55 allow data to be received from and sent to external devices 63 and 65 via the wireless interface devices 57 and 59. Each of the external devices includes its own wireless interface device for communicating with the wireless interface device of the host device. For example, the host device may be personal or laptop computer, the external device 63 may be a headset, personal digital assistant, cellular telephone, printer, fax machine, joystick, keyboard, or desktop telephone, and the second external device 65 may be an access point of a wireless local area network. In this example, the external device 63 would include a Bluetooth wireless interface device, external device 65 would include an IEEE 802.11 wireless interface device, and the computer would include both types of wireless interface devices.

In operation, to avoid interference between the two or more wireless interface devices 57 and 59 of the wireless communication device, the MAC layer modules of each wireless interface device 57 and 59 communicate with each other to avoid concurrent transmission and/or reception of wireless transmissions with the corresponding external device if such concurrent transmission or reception would cause interference. The methods in which the MAC layer modules communicate are illustrated in FIGS. 6-8.

For data received from one of the wireless interface devices 57 or 59 (e.g., inbound data), the radio interface 54 or 55 provides the data to the processing module 50 for further processing and/or routing to the output interface 56. The output interface 56 provides connectivity to an output display device such as a display, monitor, speakers, et cetera such that the received data may be displayed. The radio interfaces 54 and 55 also provide data from the processing module 50 to the wireless interface devices 57 and 59. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to one of the wireless interface devices 57 or 59 via the corresponding radio interface 54 or 55.

FIG. 3 is a schematic block diagram of the wireless interface devices (i.e., a radio) 57 or 59, where each device includes a host interface 62, digital receiver processing module 64, an analog-to-digital converter (ADC) 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter (DAC) 78, a filtering/gain module 80, an IF mixing up conversion stage 82, a power amplifier 84, and a transmitter filter module 85. The transmitter/receiver switch 73 is coupled to the antenna section 61, which may include two antennas 86 and an antenna switch 87 (as shown in FIG. 4) that is shared by the two wireless interface devices and is further shared by the transmit and receive paths as regulated by the Tx/Rx switch 73. Alternatively, the antenna section 61 may include separate antennas for each wireless interface device (as shown in FIG. 5), where the transmit path and receive path of each wireless interface device shares the antenna. Still further, the antenna section 61 may include a separate antenna for the transmit path and the receive path of each wireless interface device. As one of average skill in the art will appreciate, the antenna(s) may be polarized, directional, and be physically separated to provide a minimal amount of interference.

Returning to the discussion of FIG. 3, the digital receiver processing module 64 the digital transmitter processing module 76, and the memory 75 may be included in the MAC module and execute digital receiver functions and digital transmitter functions in accordance with a particular wireless communication standard. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the wireless interface device 57 or 59 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11—including all current and future subsections—, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna section 61 transmits the outbound RF signal 98 to a targeted device such as a base station, an access point and/or another wireless communication device.

The wireless interface device 57 or 59 also receives an inbound RF signal 88 via the antenna section 61, which was transmitted by a base station, an access point, or another wireless communication device. The antenna section 61 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by wireless interface device. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antennas 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

FIG. 6 is a logic diagram of a method for cooperative transceiving between wireless interface devices of a host device. The method begins at step 100, where one of the wireless interface devices provides an indication of receiving an inbound packet to another one of the wireless interface devices. For example, one of the wireless interface devices transceives data packets in accordance with a Bluetooth standard while the other wireless interface devices transceives data packets in accordance with an IEEE 802.11 standard.

The method then proceeds to step 102, where the other wireless interface device processes the indication. The method then proceeds to step 104, where the other wireless interface device transmits an outbound packet in accordance with the processing of the indication. For example, the processing may be done to determine when the first wireless interface device is receiving the inbound packet. If so, the other wireless interface device delays transmitting the outbound packet until the one of the wireless interface devices has received the inbound packet. Note that to minimize the time that one wireless interface device is receiving packets, and hence reduce the wait time, the packet size of inbound packets and outbound packets may be optimized in accordance with the particular wireless communication standard.

As a further example of steps 102 and 104, the processing of the indication may be to determine whether the transmitting of the outbound packet would interfere with the receiving of the inbound packet. If so, the other wireless interface device delays transmitting the outbound packet until the one of the wireless interface devices has received the inbound packet. If the transmitting of the outbound packet would not interfere with the receiving of the inbound packet, the other wireless interface device transmits the outbound packet while the inbound packet is being received. Note that to reduce interference, the wireless interface device that is compliant with the Bluetooth standard may adaptively adjust its frequency hopping sequence to reduce interference with the other wireless interface device.

FIG. 7 is a logic diagram of another method for cooperative transceiving between wireless interface devices of a host device. The process begins at step 106, where the wireless interface devices exchange status messages regarding transmission and reception of packets. Note that a status message may be provided in response to a request from the other wireless communication device for a particular piece of information, for a full status report, or any portion thereof. The method then precedes to step 108, where each of the wireless interface devices process the received status messages. The method then proceeds to step 110, where each of the wireless interface devices transmits an outbound packet in accordance with the processing of the received status messages.

In one example of the processing of the status message and transmitting of the outbound packet, the wireless interface device determines that the other wireless interface device is currently receiving an inbound packet. In this situation, the wireless interface devices delays transmitting of the outbound packet until the other wireless interface device has received the inbound packet.

In another example of the processing of the status message and transmitting of the outbound packet, the wireless interface device determines that the other wireless interface device is expecting to receive an inbound packet. In this situation, the wireless interface device delays transmitting of the outbound packet until the other wireless interface device has received the inbound packet unless the delay would cause an interrupt for low latency real time transmissions.

In yet another example of the processing of the status message and transmitting of the outbound packet, the wireless interface device determines that the other wireless interface device is transmitting an outbound message. In this situation, the wireless interface device delays transmitting of the outbound packet until the other wireless interface device has transmitted the inbound packet unless interference would be minimal or if a delay would cause an interrupt for low latency real time transmissions.

In a further example of the processing of the status message and transmitting of the outbound packet, the wireless interface device determines that the other wireless interface device is expecting to transmit another outbound message. In this situation, the wireless interface device randomizing the delaying transmitting the outbound packet in accordance with a random transmission protocol. For example, each wireless interface device may be assigned a unique wait period when they detect that two or more wireless interface devices are desiring to transmit a packet at about the same time.

FIG. 8 is a logic diagram of yet another method for cooperative transceiving between wireless interface devices of a host device. The method begins at step 112 where a first wireless interface device determines whether a second wireless interface device is transmitting an outbound packet. If, as established at step 114, the second wireless interface device is not transmitting, the method precedes to step 122, where the first wireless interface device transmits its packet. If, however, the second wireless interface device is transmitting, the method precedes to step 116, where the first wireless interface device determines whether transmitting its outbound packet would interfere with the transmitting of the second outbound packet. This may be done by comparing the transmit power level of the first wireless interface device with the transmit power level of the second wireless interface device. If they are similar and relatively low, the interference may be minimal.

The method then precedes to step 118 where a determination is made as to whether the interference is of a level that would jeopardize the integrity of the second outbound packet. If not, the method precedes to step 122, where the packet is transmitted. If, however, there would be sufficient interference, the method precedes to step 120 where the first wireless interface device delays transmitting the first outbound packet until the second outbound packet has been transmitted.

FIG. 9 is a diagram illustrating wireless interface devices 57 and 59 associated with a host device 18-32 coordinating communications with two external wireless devices 63 and

65. The wireless interface devices 57 and 59 and the external wireless devices 63 and 65 may communication using any type of standardized wireless communication including, but not limited to, IEEE 822.11(a), (b), or (g), Bluetooth, GSM, CDMA, TDMA, LMPS, or MMPS. The external devices 63 and 65 may use the same or different wireless communication standard. When the external devices 63 and 65 use standards that occupy the same or similar frequency spectrums, a conflict between concurrent communications may occur. In other words, when the both external devices are communicating with the wireless interface devices 57 and 59 their respective communications may interfere with the other's communication, reducing the quality of service for one or both communications.

To resolve the conflict, the wireless interface devices 57 and 59 coordinate the communications with their respective external devices 63 and 65. As shown in the accompanying table of FIG. 9, when a conflict arises, the wireless interface devices 57 and 59 have a multitude of resolutions. For example, when both wireless interface devices 57 and 59 desire to concurrently transmit packets to their respective external devices 63 and 65 (i.e., concurrently includes any overlap of transmission), the wireless interface devices 57 and 59 determine whether a concurrent transmission would cause sufficient interference that would degrade one or both of the transmissions. If not, the resolution is to do nothing and concurrently transmit.

If, however, sufficient interference would exist, the wireless interface devices may delay one of the transmissions with respect to the other to avoid concurrent transmissions, reduce the transmit power for one or both of the concurrent transmissions, and/or adjust the frequency hopping of a Bluetooth compliant wireless interface device 57 or 59. The wireless interface devices 57 and 59 may delay the transmissions based on a priority protocol, a host protocol, a default mechanism, an ad hoc mechanism, or a user defined ordering. In essence, the delaying of the concurrent transmissions removes the concurrency such that only one transmission is occurring at any given time. The delaying may be established by an equal or imbalanced staggering of the transmissions or by allowing one of the communications to complete before the other is serviced. For example, the host protocol may prohibit concurrent communications. As such, the communication with one of external devices that was initiated first will be completed before communication with the other external devices is serviced.

As a further example of the delaying of concurrent transmissions, the priority protocol may dictate that user interface wireless devices (e.g., wireless keyboard, mouse, etc.) may have priority over data transfer peripheral wireless devices (e.g., PDA, down loading data to a cell phone, a printer, etc.). The priority protocol may also prioritize real time communications (e.g., voice, audio, and/or video data) over data transfer communications. In addition, the priority protocol may indicate whether the concurrent transmissions are to be staggered or sequential.

The user defiled priority list may be based on the type of external devices. For example, the user may priority communications with his or her PDA over any other type of communications, followed by communications with the cell phone, etc. In this manner, the conflict resolution may be customized to the user's preferences.

When the conflict corresponds to one wireless interface device potentially transmitting data while the other wireless interface device is potentially receiving data, the wireless interface devices determine whether concurrent transmission and reception would cause significant interference. If not, the current transmission and reception is performed. If, however, significant interference would be produced, the wireless interface device may resolve the conflict by delaying the transmission to avoid the concurrency, delaying the reception to avoid the concurrency, reducing the transmit power, adjusting the frequency hopping of a Bluetooth device, process the conflict based on the host protocol and/or based on the priority protocol.

When the conflict corresponds to concurrent receptions, the wireless interface devices determine whether such concurrency would cause significant interference. If not, the concurrent receptions are processed. If, however, significant interference would exist, one of the receptions may be delayed to avoid the concurrency, one of the external devices may be instructed to reduce its transmitting power.

The preceding discussion has presented a method and apparatus for cooperative transceiving between wireless interface devices of a host device. By enabling the wireless interface devices to communicate directly with each other, interference between them may be reduced and/or avoided. As one of average skill in the art will appreciate, other embodiments may be derived from the teachings of the present invention without deviating from the scope of the claims.

What is claimed is:

1. A method for cooperative transceiving between wireless interface devices of a host device, comprising:
   providing, by a first wireless interface device, a data indication of receiving an inbound packet to a second wireless interface device;
   processing, by the second wireless interface device, the data indication to determine a receiving state of the first wireless interface device;
   determining a level of interference between a transmission of an outbound packet by the second wireless interface device and the reception of the inbound packet by the first wireless interface device based on the receiving state of the first wireless interface device;
   transmitting, by the second wireless interface device, the outbound packet while the inbound packet is being received, when the level of interference between the outbound packet and the inbound packet is sufficiently low; and
   transmitting, by the second wireless interface device, the outbound packet using an interference mitigation technique when the level of interference between the outbound packet and the inbound packet is relatively high.

2. The method of claim 1, wherein the transmitting, by the second wireless interface device, the outbound packet using the interference mitigation technique includes:
   delaying transmitting the outbound packet until the first wireless interface device has received the inbound packet.

3. The method of claim 2, wherein the delaying transmitting the outbound packet is based on at least one of a priority protocol, a host protocol, a default mechanism, an ad hoc mechanism, and a user defined ordering.

4. The method of claim 1, wherein the first wireless interface device transceives data packets in accordance with a Bluetooth standard and the second wireless interface device transceives data packets in accordance with an IEEE 802.11 standard.

5. The method of claim 4, further comprising:
   adaptively adjusting frequency hopping by the first wireless interface device to reduce interference.

6. The method of claim 1, further comprising:
optimizing packet size of the inbound packet and the outbound packet to minimize transmission time and reception time.

7. The method of claim 1, wherein the interference mitigation technique includes at least one of:
delaying transmitting the outbound packet until the first wireless interface device has received the inbound packet;
reducing a transmit power of the transmission of the outbound packet; and
adaptively adjusting frequency hopping by the second wireless interface device.

8. A method for cooperative transceiving between wireless interface devices of a host device, comprising:
exchanging status messages regarding transmission and reception of packets by a first and a second wireless interface device;
processing, by the first wireless interface device, a first received status message, to determine an activity state of the second wireless interface device, wherein the activity state of the second wireless interface device includes an indication of a receiving status, a transmitting status, and a transmit power level of the second wireless interface device;
processing, by the second wireless interface device, a second received status message, to determine an activity state of the first wireless interface device, wherein the activity state of the first wireless interface device includes an indication of a receiving status, a transmitting status, and a transmit power level of the first wireless interface device;
determining a level of interference between a transmission of a first outbound packet by the first wireless interface device and a transmission of a second outbound packet by the second wireless interface device based on the activity state of the first and second wireless interface devices;
transmitting the first and second outbound packets when the level of interference between the first and second outbound packets is sufficiently low; and
transmitting the first and second outbound packets using an interference mitigation technique when the level of interference between the first and second outbound packets is relatively high.

9. The method of claim 8, wherein the exchanging the status messages comprises:
providing the first received status message to the first wireless interface device in response to a first request, and
providing the second received status message to the second wireless interface device in response to a second request.

10. The method of claim 8, wherein the processing the first received status message comprises:
determining that the second wireless interface device is currently receiving a second inbound packet, and
wherein the transmitting the first outbound packet comprises:
delaying transmitting the first outbound packet until the second wireless interface device has received the second inbound packet, and
wherein the processing the second received status message comprises:
determining that the first wireless interface device is currently receiving a first inbound packet, and
wherein the transmitting the second outbound packet comprises:
delaying transmitting the second outbound packet until the first wireless interface device has received the first inbound packet.

11. The method of claim 8, wherein the processing the first received status message comprises:
determining that the second wireless interface device is expecting to receive a second inbound packet, and
wherein the transmitting the first outbound packet comprises:
delaying transmitting the first outbound packet until the second wireless interface device has received the second inbound packet, and
wherein the processing the second received status message comprises:
determining that the first wireless interface device is expecting to receive a first inbound packet, and
wherein the transmitting the second outbound packet comprises:
delaying transmitting the second outbound packet until the first wireless interface device has received the first inbound packet.

12. The method of claim 8, wherein the processing the first received status message comprises:
determining that the second wireless interface device is transmitting a second outbound message, and
wherein the transmitting the first outbound packet comprises:
delaying transmitting the first outbound packet until the second wireless interface device has transmitted the second outbound message, and
wherein the processing the second received status message comprises:
determining that the first wireless interface device is transmitting a first outbound message, and
wherein the transmitting the second outbound packet comprises:
delaying transmitting the second outbound packet until the first wireless interface device has transmitted the first outbound message.

13. The method of claim 8, wherein the processing the first received status message comprises:
determining that the second wireless interface device is expecting to transmit a second outbound message, and
wherein the transmitting the first outbound packet comprises:
randomizing delaying transmitting the first outbound packet in accordance with a random transmission protocol, and
wherein the processing the second received status message comprises:
determining that the first wireless interface device is expecting to transmit a first outbound message, and
wherein the transmitting the second outbound packet comprises:
randomizing delaying transmitting the second outbound packet in accordance with the random transmission protocol.

14. The method of claim 8, wherein the interference mitigation technique includes at least one of:
delaying transmitting of at least one of the first and second outbound packets;
reducing a transmit power of the transmission of at least one of the first and second outbound packets; and
adaptively adjusting frequency hopping by at least one of the first and second wireless interface devices.

15. A wireless communication device, comprising:
a host module;
a first wireless interface device operably coupled to the host module, wherein the first wireless interface device transceives first data between the host module and a first external device in accordance with a first wireless communication protocol;
a second wireless interface device operably coupled to the host module, wherein the second wireless interface device transceives second data between the host module and a second external device in accordance with a second wireless communication protocol; and
an antenna section operably coupled to the first and second wireless interface devices to provide at least one radio frequency communication path between the first wireless interface device and the first external device and between the second wireless interface device and the second external device,
wherein the first and second wireless interface devices are configured to determine a level of interference between a communication of the first data by the first wireless interface device and a communication of the second data by the second wireless interface device;
wherein the first and second wireless interface devices are configured to communicate the first and second data, respectively, when the level of interference between the communication of the first and second data is sufficiently low, and
wherein the first and second wireless interface devices are configured to communicate the first and second data, respectively, using an interference mitigation technique when the level of interference between the communication of the first and second data is relatively high.

16. The wireless communication device of claim 15, wherein the antenna section comprises:
a first directional antenna operably coupled to the first wireless interface device; and
a second directional antenna operably coupled to the second wireless interface device.

17. The wireless communication device of claim 15, wherein the antenna section comprises:
at least two antennas; and
an antenna switch configured to couple one of the at least two antennas to the first wireless interface device and to couple another one of the at least two antennas to the second wireless interface device.

18. The wireless communication device of claim 15, wherein the interference mitigation technique includes at least one of:
delaying transmitting of at least one of the first and second outbound packets;
reducing a transmit power of the transmission of at least one of the first and second outbound packets; and
adaptively adjusting frequency hopping by at least one of the first and second wireless interface devices.

19. A method for cooperative transceiving between wireless interface devices of a host device, comprising:
determining, by a first wireless interface device, whether a second wireless interface device is transmitting a second outbound packet,
wherein the determining is performed by the first wireless interface device processing a data indication provided by the second wireless interface device;
when the second wireless interface device is transmitting the second outbound packet, determining, by the first wireless interface device, a level of interference between a transmission of a first outbound packet by the first wireless interface device and a transmission of the second outbound packet by the second wireless interface device;
when the level of interference is sufficiently low, transmitting the first and second outbound packets; and
when the level of interference is relatively high, delaying transmitting of the first outbound packet until the second outbound packet has been transmitted.

20. The method of claim 19, wherein the delaying transmitting is established by a staggering of the first outbound packet and the second outbound packet.

21. A method for cooperative wireless communication by wireless interface devices of a host device, comprising:
determining, by a first wireless interface device, whether a first communication between the first wireless interface device and a first peripheral wireless device is in conflict with a second communication between a second wireless interface device and a second peripheral wireless device,
wherein the determining is performed by the first wireless interface device processing a data indication provided by the second wireless interface device;
determining a level of conflict between the first communication and the second communication; and
when the level of conflict between the first communication and the second communication is sufficiently low, allowing the first and second communications to be performed,
when the level of conflict between the first communication and the second communication is relatively high, resolving, by the first and second wireless interface devices, the conflict by altering the first communication based on a predefined precedence.

22. The method of claim 21, wherein the determining the conflict further comprises one or more of:
determining whether concurrent transmissions by the first and second wireless interface devices would cause interference of the first communication or the second communication;
determining whether transmission by the first wireless interface device would interfere with reception by the second wireless interface device;
determining whether transmission by the second wireless interface device would interfere with reception by the first wireless interface device;
determining whether concurrent reception by the first and second wireless interface devices would cause interference of the first or second communication;
determining whether a host protocol prohibits concurrent communications by the first and second wireless interface devices; and
determining whether a priority protocol applies to communications with the first or second peripheral wireless device.

23. The method of claim 21, wherein the resolving the conflict further comprises:
when concurrent transceiving by the first and second wireless interface devices causes interference of the first or second communication, determining, by at least one of the first and second wireless interface devices, whether transmission power can be reduced to substantially eliminate the interference; and
when the transmission power can be reduced to substantially eliminate the interference, adjusting the transmission power to substantially eliminate the interference.

* * * * *